US009612712B2

(12) United States Patent
Huebner et al.

(10) Patent No.: US 9,612,712 B2
(45) Date of Patent: Apr. 4, 2017

(54) SCREEN CLEANING SYSTEM FOR A MOTOR VEHICLE

(71) Applicant: FORD GLOBAL TECHNOLOGIES, LLC, Dearborn, MI (US)

(72) Inventors: Annette Lynn Huebner, White Lake, MI (US); Kristin Ann Hellman, Walled Lake, MI (US); Scott Holmes Dunham, Redford, MI (US); Coleen Reister, Sarasota, FL (US); Vichit Chea, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 14/590,053

(22) Filed: Jan. 6, 2015

(65) Prior Publication Data

US 2016/0193634 A1 Jul. 7, 2016

(51) Int. Cl.
| | | |
|---|---|---|
| *B43K 23/02* | (2006.01) | |
| *G06F 3/0481* | (2013.01) | |
| *B60S 3/00* | (2006.01) | |
| *B08B 11/02* | (2006.01) | |
| *B60R 11/06* | (2006.01) | |
| *B08B 1/00* | (2006.01) | |

(52) U.S. Cl.
CPC .............. *G06F 3/0481* (2013.01); *B08B 1/00* (2013.01); *B08B 11/02* (2013.01); *B60R 11/06* (2013.01); *B60S 3/008* (2013.01)

(58) Field of Classification Search
CPC .......... B08B 11/02; B60S 3/008; B08S 1/006; B60R 7/06

USPC .......................................... 401/131; 345/173
See application file for complete search history.

(56) References Cited

U.S. PATENT DOCUMENTS

| | | | | |
|---|---|---|---|---|
| 6,208,331 | B1 * | 3/2001 | Singh ..................... | G06F 3/0488 345/156 |
| 8,695,152 | B2 * | 4/2014 | Lemchen ................ | B08B 1/008 15/246 |
| 9,180,495 | B2 * | 11/2015 | Croteau .................. | B65D 85/00 |
| 2004/0118439 | A1 | 6/2004 | Durrant et al. | |
| 2015/0101137 | A1 * | 4/2015 | Xu .......................... | A47L 13/12 15/104.93 |

FOREIGN PATENT DOCUMENTS

| | | |
|---|---|---|
| CN | 201009860 Y | 1/2008 |
| CN | 203237218 U | 10/2013 |
| JP | H02286456 A | 11/1990 |
| JP | H10129429 A | 5/1998 |
| JP | 2001149828 A | 6/2001 |

OTHER PUBLICATIONS

English Machine Translation for CN201009860.
English Machine Translation for CN203237218.
English Machine Translation for JPH10129429.
English Machine Translation for JP2001149828.

* cited by examiner

*Primary Examiner* — Jennifer C Chiang
(74) *Attorney, Agent, or Firm* — Vichit Chea; King & Schickli, PLLC

(57) ABSTRACT

A screen cleaning system for a motor vehicle includes a screen cleaning device and a dedicated receiver for holding the screen cleaning device. That receiver is integrated into the interior trim of the motor vehicle.

16 Claims, 5 Drawing Sheets

SCREEN CLEANING SYSTEM FOR A MOTOR VEHICLE

TECHNICAL FIELD

This document relates generally to the motor vehicle equipment field and, more particularly, to a screen cleaning system as well as to a touchscreen for a motor vehicle.

BACKGROUND

Motor vehicles are often equipped with display screens in the center stack or other areas. These may be used for a number of purposes and may display vehicle information relating to, for example, the entertainment system, the navigation system, the climate control system, the time, vehicle operating parameters or the like. Many vehicles now incorporate rear view cameras and the video image from such a camera may also be displayed on the screen to aid when backing up a vehicle.

In addition, many motor vehicles today are equipped with touchscreens thereby effectively turning the screen into a control panel and allowing the elimination of various switch gear from the center stack and instrument panel for a cleaner uncluttered appearance.

While these screens provide a number of benefits and advantages and are becoming more and more popular, it should be appreciated that they are also prone to unsightly finger prints. Further, dust tends to collect on these screens over time. Up until the present, the operator has had to bring a cloth and cleaning solution into the vehicle every time he wished to clean the screen or store such cleaning supplies inside the center console, door pockets or glove box of the vehicle where they occupy storage that could be used for other items and are loosely held and free to shift around and create annoying rattles and noise during vehicle operation.

The screen cleaning system disclosed in this document addresses this problem by providing a screen cleaning device and a dedicated receiver integrated into the interior trim that holds the screen cleaning device.

SUMMARY

In accordance with the purposes and benefits described herein, a screen cleaning system is provided for a motor vehicle. That screen cleaning system comprises a screen cleaning device and a dedicated receiver for holding the screen cleaning device. The dedicated receiver is integrated into the interior trim of the motor vehicle.

In one possible embodiment, the receiver is provided on a center stack of the vehicle. Thus, the receiver may be provided adjacent the viewing screen in the motor vehicle. In another possible embodiment, the receiver is provided on the center console. In yet another possible embodiment, the receiver is provided in a storage compartment in the center console. In yet another possible embodiment, the receiver is provided on an instrument panel of the motor vehicle.

In one possible embodiment, the screen is a touchscreen and the system further includes a cleaning mode wherein all screen settings are frozen so that no setting is changed inadvertently during screen cleaning. Such an embodiment may include an actuator to activate and deactivate cleaning mode. That actuator may be a switch associated with the receiver so that when the screen cleaning device is removed from the receiver, cleaning mode is activated. In contrast, when the screen cleaning device is held in the receiver, cleaning mode is deactivated. In one possible embodiment, when activated, the cleaning mode is indicated on the touchscreen. In another possible embodiment, the screen is a solid color in cleaning mode so as to aid in identifying dirt and dust on the screen. In yet another possible embodiment, the actuator is a switch located on the vehicle trim adjacent the touchscreen.

In one possible embodiment, the screen cleaning device includes a base, a handle and a cleaning pad. In another possible embodiment, the screen cleaning device includes a body having a cleaning fluid reservoir, a wet cleaning pad and a metering device for metering cleaning fluid from the reservoir to the wet pad. Further the screen cleaning device may include a handle, a dry pad and a removable cap covering the dry pad. The handle is connected to the body and closes the reservoir in the body.

In accordance with an additional aspect, a touchscreen system is provided for a motor vehicle. The touchscreen system comprises a touchscreen having a cleaning mode wherein the screen settings are frozen so that no setting is changed inadvertently during screen cleaning.

In one possible embodiment the system further includes an actuator to activate and deactivate cleaning mode. In one possible embodiment that actuator is a switch located on interior trim the vehicle adjacent the touchscreen. In another possible embodiment the touchscreen indicates when the touchscreen is in cleaning mode.

In the following description, there are shown and described several preferred embodiments of the screen cleaning system. As it should be realized, the screen cleaning system is capable of other, different embodiments and its several details are capable of modification in various, obvious aspects all without departing from the screen cleaning system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the screen cleaning system and together with the description serve to explain certain principles thereof. In the drawing figures.

Reference will now be made in detail to the present preferred embodiments of the screen cleaning system, examples of which are illustrated in the accompanying drawing figures.

DETAILED DESCRIPTION

Figure 1:
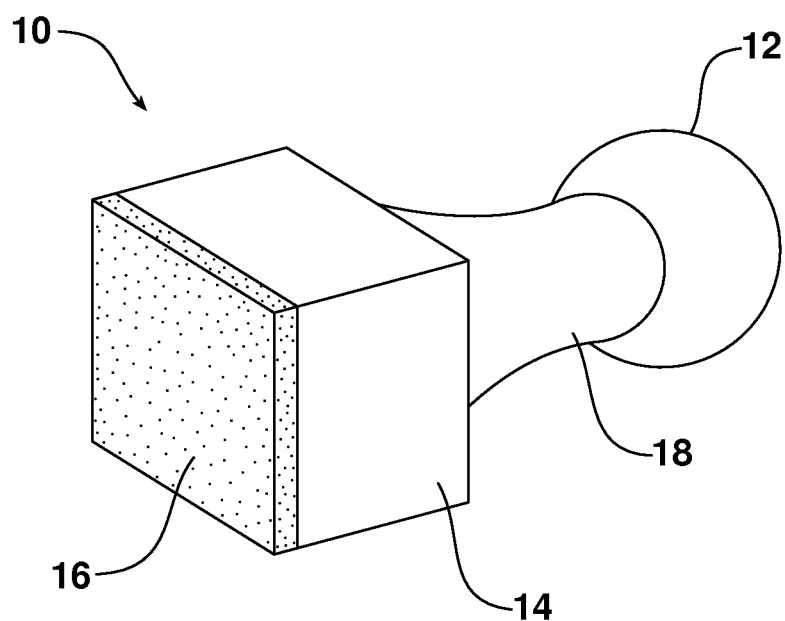
FIG. 1 is a perspective view of a first embodiment of a screen cleaning device incorporating a base, a cleaning pad and a handle.

Reference is now made to FIG. 1 illustrating a first embodiment of screen cleaning system 10. As best illustrated in FIG. 1, that screen cleaning system 10 includes a screen cleaning device 12 comprising a base 14 having a cleaning pad 16 on one side and a projecting handle 18 on the other side. In one possible embodiment the cleaning pad 16 is a dry pad of microfiber material.

Figure 2A:
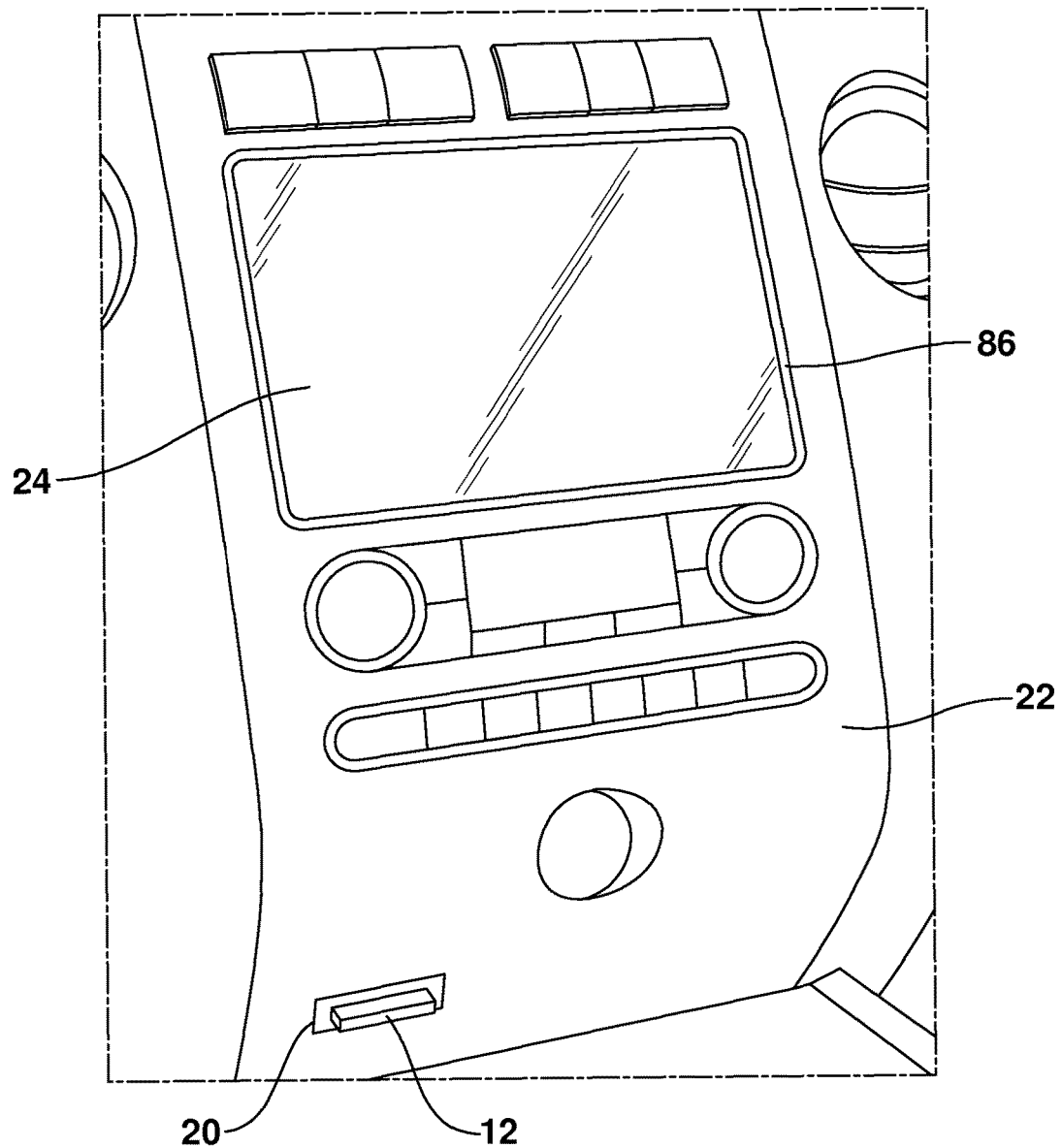
FIG. 2a is a perspective view illustrating the cleaning device held in a receiver on the center stack of the motor vehicle.
Figure 2B:
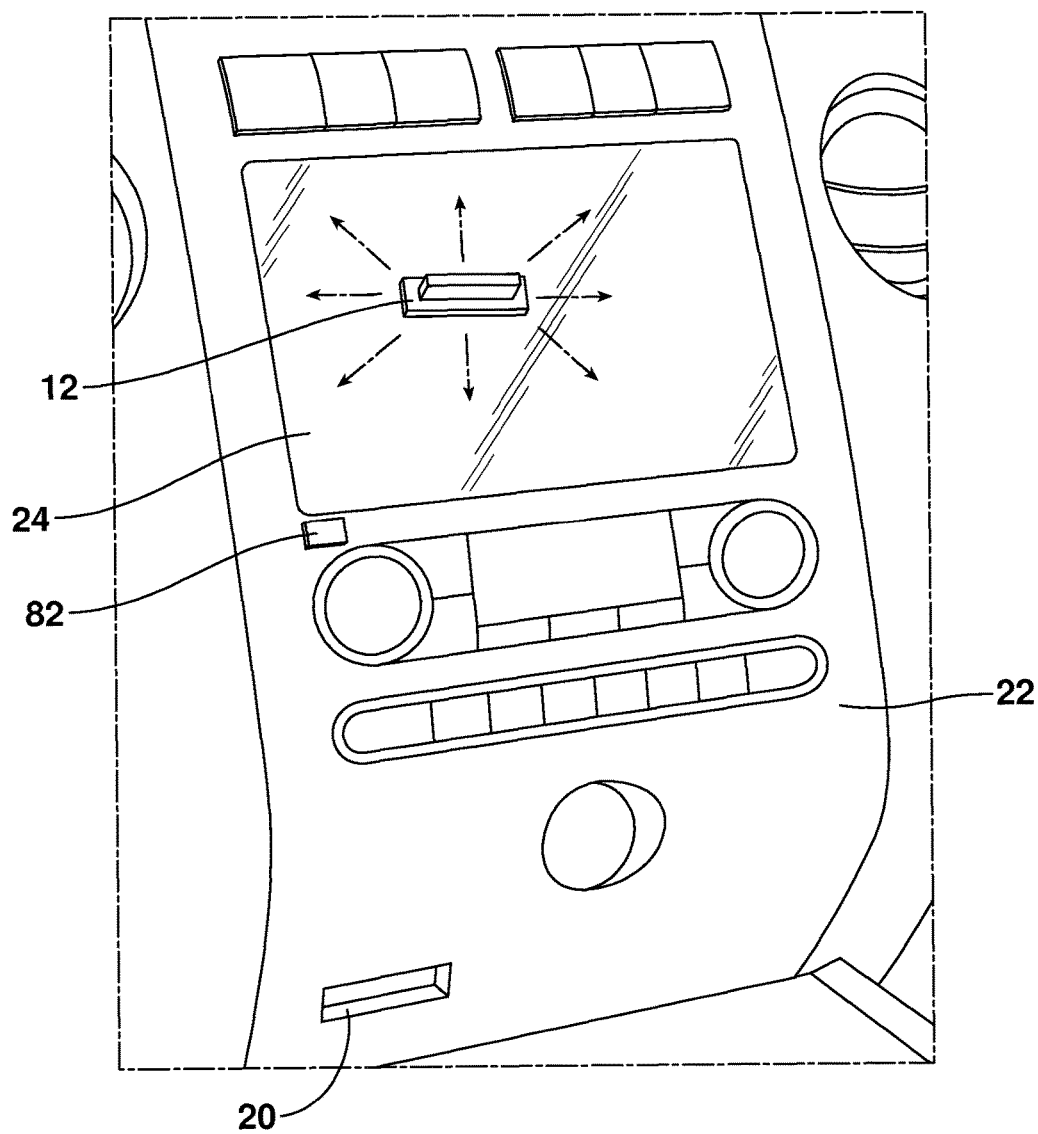
FIG. 2b is an illustration of the cleaning device being used to clean the center touchscreen of the motor vehicle.

A second embodiment of screen cleaning device 12 is illustrated in FIGS. 2a and 2b. As illustrated in FIG. 2a, that screen cleaning device 12 is held in a dedicated receiver 20 when not in use. That receiver 20 may be integrated into the interior trim of the motor vehicle at various locations including, for example, the center stack 22 adjacent a viewing screen 24 (see FIG. 2a). It should be appreciated that the center stack position for the receiver 20 is merely presented for purposes of illustration and description and that other locations could be utilized if desired.

Figure 3:
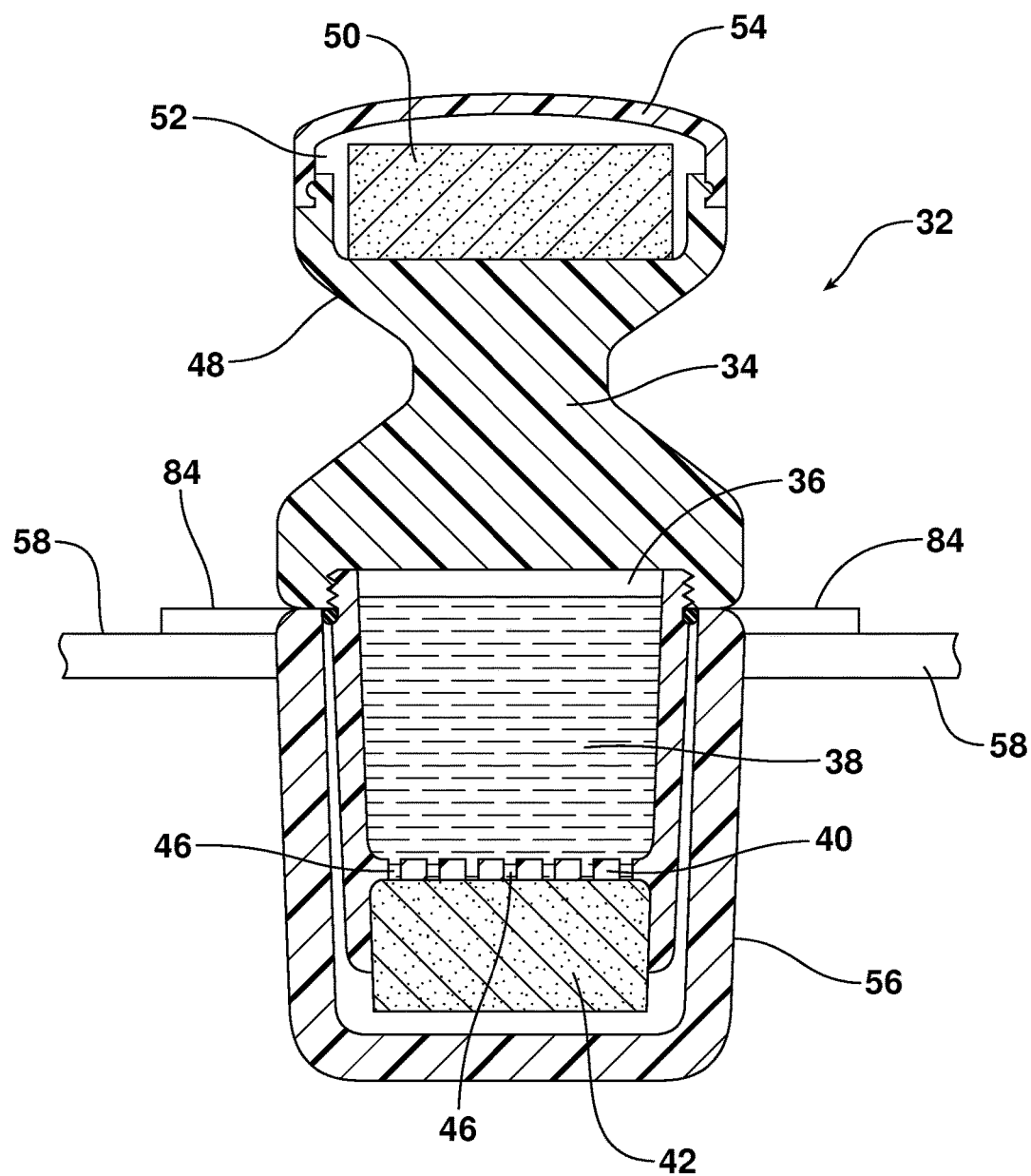
FIG. 3 is a cross-sectional view of an alternative embodiment of the screen cleaning device including both a wet cleaning pad and a dry cleaning pad.

As illustrated in FIG. 3, the screen cleaning device 12 may be removed from the dedicated receiver 20 at any desired time and used to clean the viewing screen 24 of fingerprints dust and dirt as desired. This is done by simply wiping the cleaning pad 16 over the viewing screen 24 (note action arrows).

Reference is now made to FIG. 3 illustrating yet another alternative embodiment of screen cleaning device 32. The screen cleaning device 32 includes a body 34 having a reservoir 36 holding cleaning fluid 38. A metering device 40 meters cleaning fluid 38 from the reservoir 36 to the wet cleaning pad 42. In the illustrated embodiment, the metering device 40 comprises a disk including a series of small fluid feeding apertures 46 that function to feed cleaning fluid 38 to the cleaning pad 42 by capillary action.

The screen cleaning device 32 further includes a handle 48 and a dry pad 50 held in a compartment 52 beneath a removable cap 54.

In use, an individual removes the cleaning device 32 from the receiver or well 56 held in an interior trim component 58 of the vehicle. The individual may then use the wet cleaning pad 42 to clean fingerprints and dust from the viewing screen 24. Afterwards or in the alternative, the individual may remove the cap 54 and sweep the viewing screen 24 with the dry pad 50 to complete the cleaning of the viewing screen.

Figure 4:
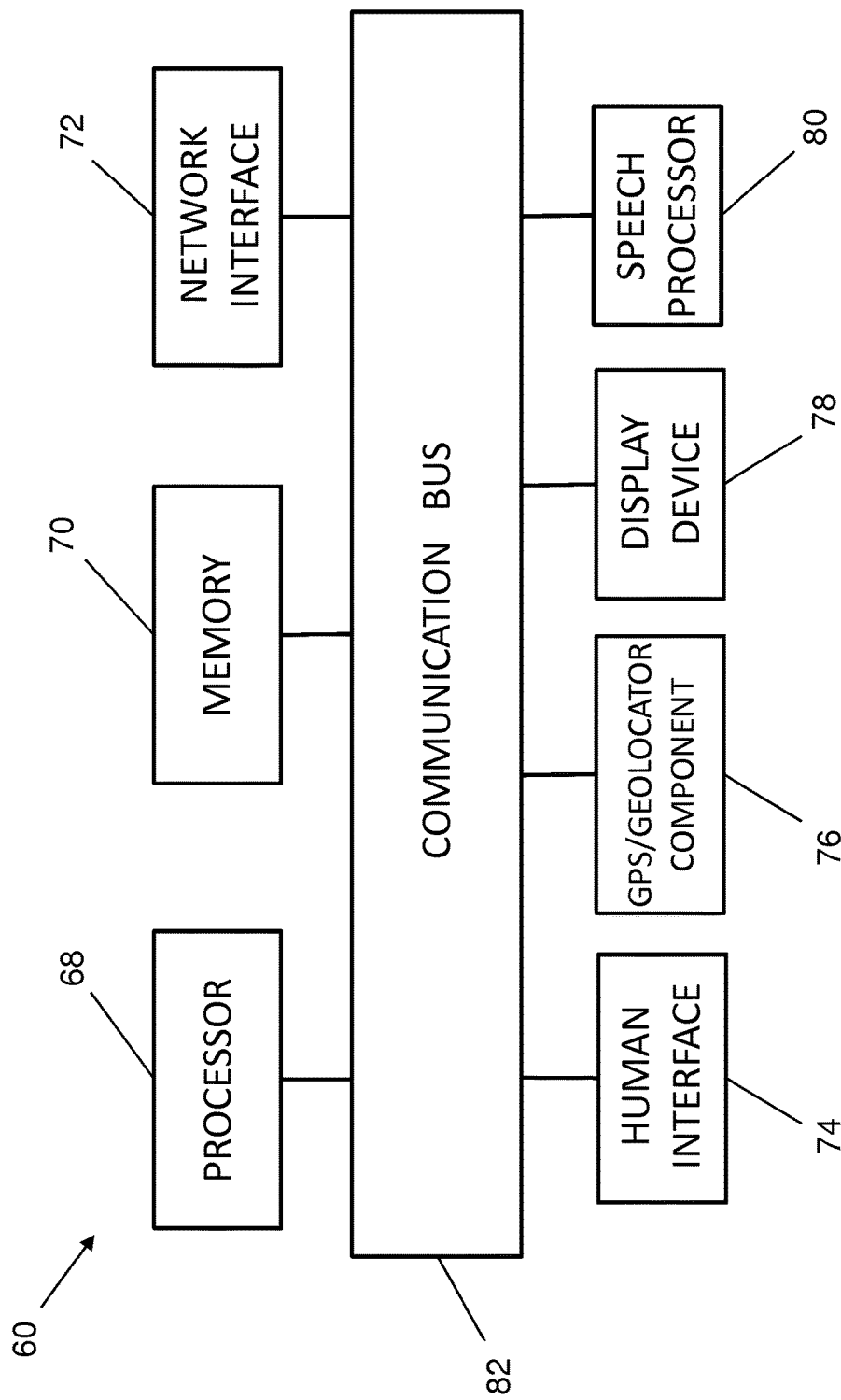
FIG. 4 is a schematic block diagram of a control system of a motor vehicle incorporating a touchscreen display.

Many high-end motor vehicles today include a body control module 60. As illustrated in FIG. 4, such a body control module 60 may comprise a computing device having one or more processors 68, one or more memories 70, one or more interfaces 72, a human interface 74, a GPS/geo locator component 76, a display device such as a multi-function display with touchscreen capability 78 and a speech processor 80 that all communicate with each other over communication bus 82. The body control module 60 performs a number of interior body electrically based functions including, for example, interior locking, remote key entry, interior lighting, exterior lighting, windshield wiper control and the like. In some embodiments the body control module 60 may also function to control entertainment functions (e.g. radio, CD player and communications such as telephone and Internet communications over a wireless network). In some embodiments the body control module 60 is connected by communication bus (not shown) to other control modules that provide one or more of these additional functions.

Where the viewing screen 24 is a touchscreen, cleaning of the screen may inadvertently change vehicle operating settings such as radio stations, entertainment system volume, climate control settings and the like that are accessed and controlled through the touchscreen.

In order to avoid this problem, the screen cleaning system 10 further includes a cleaning mode wherein all screen settings are frozen so that no setting is changed inadvertently during screen cleaning. In one possible embodiment, the cleaning mode is activated by contacting the touchscreen 24/78 at an image indicating the cleaning mode function. In another possible embodiment a separate actuator or switch 82 is provided on the center stack 22 to activate and deactivate cleaning mode. See FIG. 2b. In yet another possible embodiment illustrated in FIG. 3, an actuator switch 83 is associated with the receiver 20 or well 56 so that when the screen cleaning device 12 or 32 is removed from the receiver, cleaning mode is activated. In contrast, when the screen cleaning device 12 or 32 is held in the receiver 20 or well 56, cleaning mode is deactivated. That switch 83 may comprise, for example, a microswitch, a capacitive sensor or the like.

In one possible embodiment, when cleaning mode is active, that activation is indicated by a message presented on the touchscreen. In another possible embodiment, when cleaning mode is activated, the indication is provided by a separate indicator such as an illuminated bezel 84 around the receiver 56 (see FIG. 3) or an illuminated bezel 86 around the screen 24 to be cleaned (see FIG. 2a). Not only does the illumination of the bezel 84 or 86 alert the driver to the fact that the cleaning device 12 or 32 has been removed from the receiver 20 or well 56, it also aids in preventing the cleaning device from being misplaced or lost. In yet another possible embodiment, the bezel 84 could be illuminated one color, such as green, when the cleaning device 32 is in the receiver 56 and illuminated a different color, such as red, when the cleaning device is removed from the receiver.

In another possible embodiment, when cleaning mode is activated, the screen is a solid color particularly suited to help an individual see and clean finger prints and dust from the viewing screen 24. A blank or black screen are two possibilities.

In summary, the screen cleaning system 10 provides a number of benefits. The system ensures that the screen cleaning device 12 or 32 is readily available at all times to clean a viewing screen 24 of fingerprints and dust whenever needed. Further, the cleaning device 12, 32 is secured in a dedicated receiver 20 or well 56 integrated into the interior trim of the motor vehicle when not in use. There the cleaning device 12, 32 remains readily assessable to an individual at all times for user convenience. Further, the system 10 eliminates cluttering a glove box, console storage compartment or door pockets with screen cleaning utensils. Significantly, the cleaning device 12, 32, when held securely in the receiver 20, 56, will not produce an annoying vibration or rattle.

The cleaning pads 16, 42 or 50 of the screen cleaning device 12 or 32 may be replaced and the cleaning fluid reservoir 36 may be recharged with cleaning fluid 38 in some embodiments. In others, the entire screen cleaning device 12 or 32 is simply replaced as necessary due to pad wear or use of all the cleaning fluid.

The foregoing has been presented for purposes of illustration and description. It is not intended to be exhaustive or to limit the embodiments to the precise form disclosed. Obvious modifications and variations are possible in light of the above teachings. For example, while FIGS. 2a and 2b illustrate an embodiment wherein the cleaning device 12 is held in a receiver 20 provided on the center stack 22, it should be appreciated that other trim locations are possible. For example, the well 56 is held in the trim component 58 which may comprise the center console, the center console storage compartment, the instrument panel, the glove box or other conveniently located position in the motor vehicle. All such modifications and variations are within the scope of the appended claims when interpreted in accordance with the breadth to which they are fairly, legally and equitably entitled.

What is claimed:

1. A screen cleaning system for a motor vehicle having a screen, comprising:
   a screen cleaning device;
   a dedicated receiver for holding said screen cleaning device, said receiver being integrated into interior trim of said motor vehicle;
   a cleaning mode wherein all screen settings are frozen so that no setting is changed inadvertently during screen cleaning; and
   an actuator to activate and deactivate the cleaning mode, wherein said actuator is a switch associated with said receiver whereby when said screen cleaning device is removed from said receiver cleaning mode is activated and when said screen cleaning device is held in said receiver cleaning mode is deactivated.

2. The system of claim 1, wherein said receiver is provided on a center stack of said vehicle.

3. The system of claim 1, wherein said receiver is provided on a center console.

4. The system of claim 3, wherein said receiver is provided in a storage compartment in said center console.

5. The system of claim 1, wherein said receiver is provided on an instrument panel of said motor vehicle.

6. The system of claim 1, wherein said screen is a touchscreen.

7. The system of claim 6, wherein when activated, cleaning mode is indicated on said touchscreen.

8. The system of claim 7, wherein said screen is a solid color in cleaning mode so as to aid in identifying dirt and dust when cleaning.

9. The system of claim 1, wherein said screen cleaning device includes a base, a handle and a cleaning pad.

10. The system of claim 1, wherein said screen cleaning device includes a body having a cleaning fluid reservoir, a wet cleaning pad and a metering device for metering cleaning fluid from said reservoir to said wet pad.

11. The system of claim 10, wherein said screen cleaning device further includes a handle, a dry pad and a removable cap covering said dry pad.

12. The system of claim 11, wherein said handle is connected to said body and closes said reservoir in said body.

13. The system of claim 1, further including an inductor bezel around one of a screen to be cleaned or said dedicated receiver, said bezel being illuminated when said screen cleaning device is removed from said dedicated receiver.

14. A touchscreen system for a motor vehicle, comprising:
    a touchscreen having a cleaning mode wherein all screen settings are frozen so that no setting is changed inadvertently during screen cleaning; and
    an actuator to activate and deactivate cleaning mode, wherein said actuator is a switch located on interior trim of said motor vehicle adjacent said touchscreen.

15. The system of claim 14, wherein said touchscreen indicates when said touchscreen is in cleaning mode.

16. A screen cleaning system for a motor vehicle, comprising:
    a screen cleaning device;
    a dedicated receiver for holding said screen cleaning device, said receiver being integrated into interior trim of said motor vehicle; and
    an inductor bezel around one of a screen to be cleaned or said dedicated receiver, said bezel being illuminated when said screen cleaning device is removed from said dedicated receiver.

* * * * *